March 24, 1964   M. R. FROEHLICH   3,126,147
PACKAGING AND FILM STORAGE DEVICE
Filed June 22, 1960   3 Sheets-Sheet 1
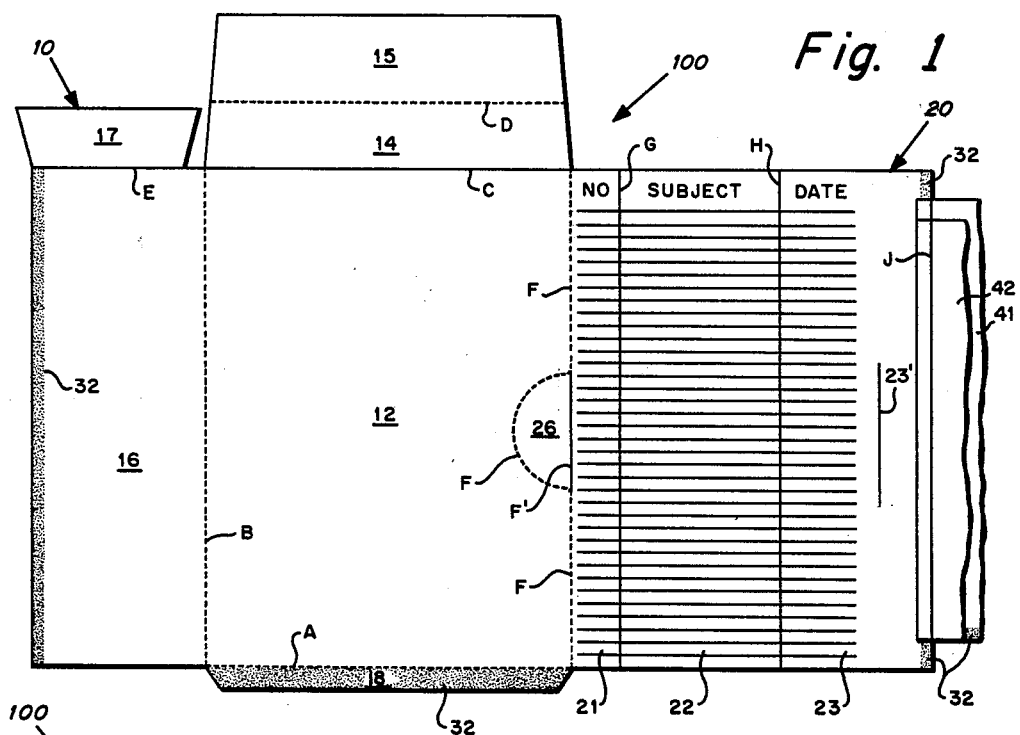
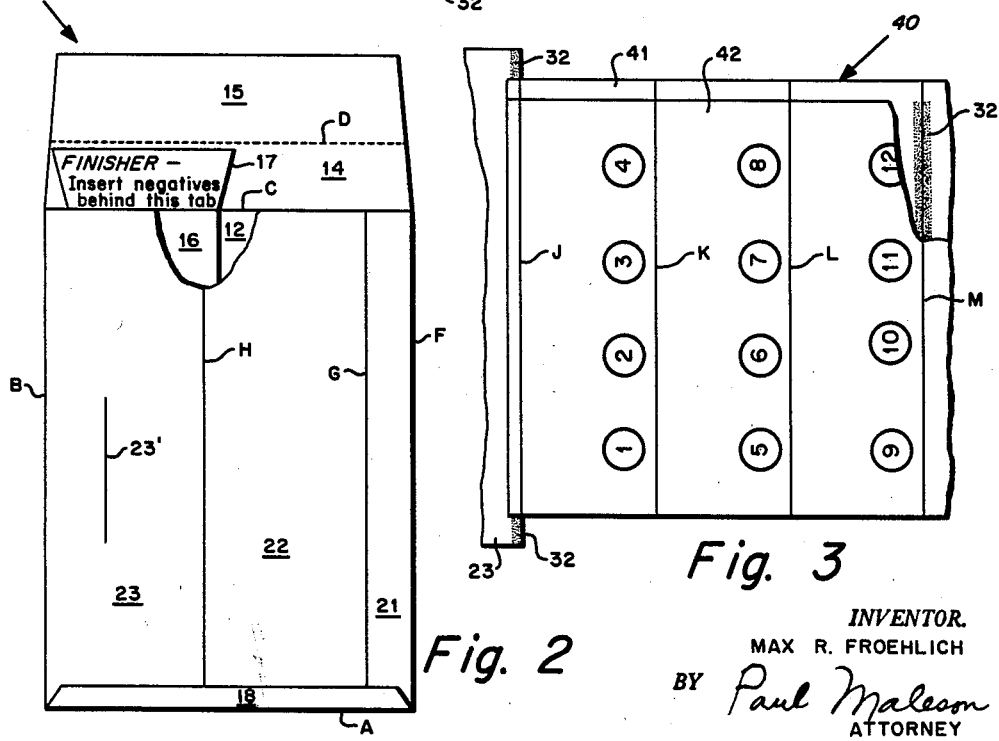
INVENTOR.
MAX R. FROEHLICH
BY Paul Maleson
ATTORNEY

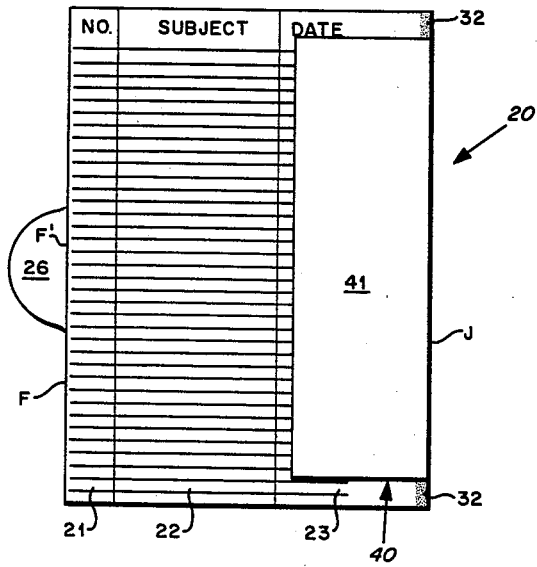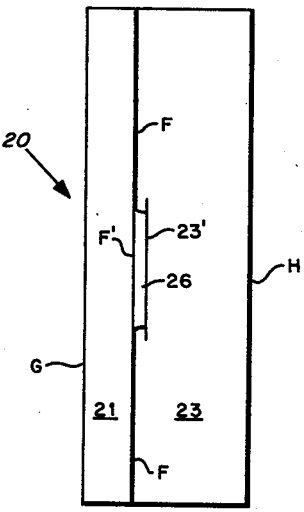

March 24, 1964 M. R. FROEHLICH 3,126,147
PACKAGING AND FILM STORAGE DEVICE
Filed June 22, 1960 3 Sheets-Sheet 3
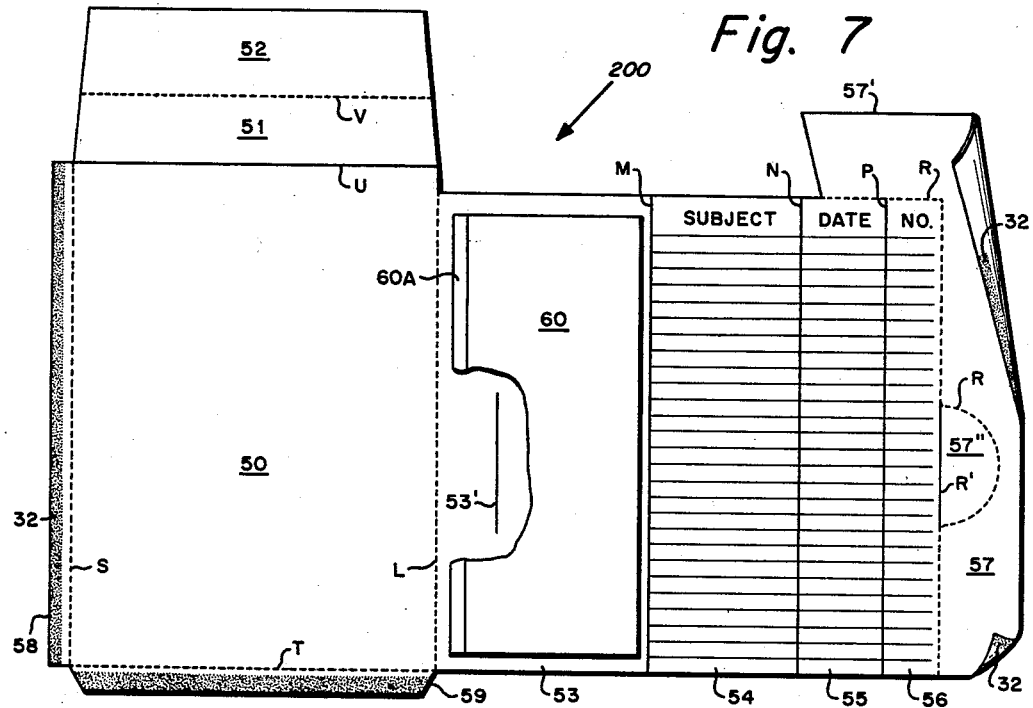
Fig. 7
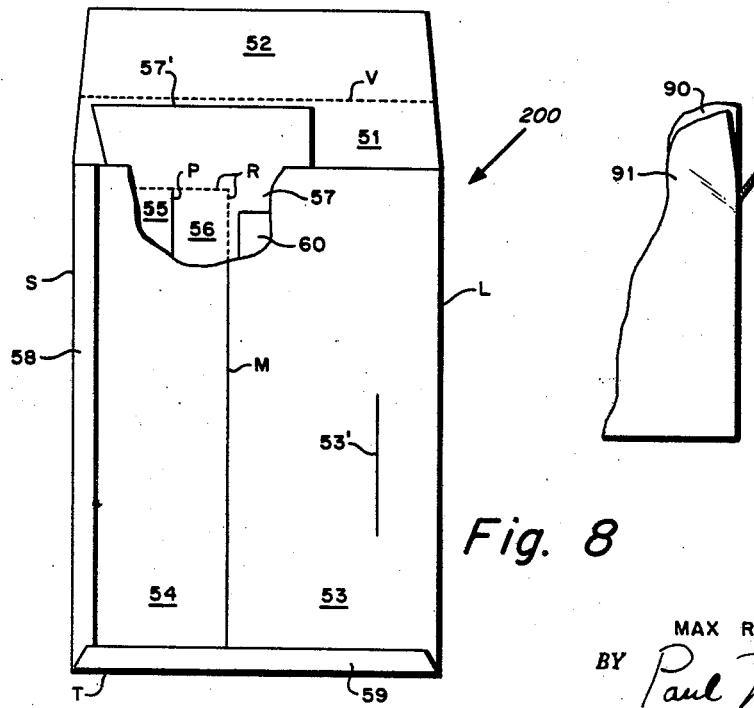
Fig. 8
Fig. 9
INVENTOR.
MAX R. FROEHLICH
BY Paul Maleson
ATTORNEY

United States Patent Office 3,126,147
Patented Mar. 24, 1964

3,126,147
PACKAGING AND FILM STORAGE DEVICE
Max R. Froehlich, Philadelphia, Pa., assignor to Wolf Brothers, Inc., Philadelphia, Pa., a corporation of Pennsylvania
Filed June 22, 1960, Ser. No. 38,037
4 Claims. (Cl. 229—72)

This invention relates to a film container. In particular, it relates to means which is adapted to be modified to serve a number of functions relating to the handling and storage of photographic film. More particularly, it relates to means which is adapted to holding undeveloped negative film for purposes of handling and shipping, of holding developed negative film and developed photographic prints made therefrom for purposes of handling and delivery from a finisher or processor. In addition, the means contemplated in this invention is adapted for conversion into means to permanently file and index developed photographic negatives.

An important aspect of this invention lies in the provision of a single means which is adapted to serve the needs of photo-finishers, retail photographic establishments, and the ultimate user or consumer of the photographic products. The exact functions which the present means is intended to serve are described in detail below, as are the exact details of structure which permit the serving of these functions in a remarkably efficient and unusual manner. For the purposes of reference to the general means throughout the specification and claims, the term "envelope" is applied, it being understood that this is a sufficiently broad term to cover the various aspects of the invention.

It is an object of this invention to provide an envelope for containing photographic materials.

It is an object of this invention to provide means for the handling and transport of undeveloped photographic films, which means is adapted to be also utilizable for handling and transport of developed photographic negatives and prints, and which means is convertible into means for the efficient indexed filing of developed photographic negatives.

It is another object of this invention to provide an envelope for the handling, transport, and storage of photographic materials, comprising a single piece of sheet material and an additional negative file affixed thereto.

Other aims and objects of this invention are made apparent in the specification below, the drawings, and the claims.

The invention is best understood in conection with the accompanying drawings in which like reference numerals refer to like parts, and in which:

FIGURE 1 is a plan view, partially fragmented, of one embodiment of the envelope before assembly, FIGURE 2 is a plan view, partially fragmented, of the envelope of FIGURE 1 after assembly, FIGURE 3 is a plan view, partially fragmented, of part of the negative file, which is incorporated in all embodiments of the invention, FIGURE 4a is a plan view of the complete negative file partially folded, FIGURE 4b is a view of the negative file of FIGURE 4a, completely folded, FIGURE 5 is a partially fragmented view of typical printed matter appearing on all forms of the envelope, FIGURE 6 is a view of the back of the envelope shown in FIGURE 2, showing typical printed matter which appears on all forms of the invention, FIGURE 7 is a view, partially in perspective and partially fragmented, showing another form of the envelope before assembly, FIGURE 8 is a view, partially fragmented, showing the envelope of FIGURE 7 after assembly, FIGURE 9 is a partially fragmented detailed view of an alternate means for opening any embodiment of the envelope.

Before explaining the operation, functions, and advantages of the envelope, the physical structure of the envelope in its various embodiments will be described in detail. One embodiment is shown in FIGURE 1, before folding to form the finished product shown in FIGURE 2, or the final device shown in FIGURE 4b.

The envelope, generally designated 100, comprises a single piece of flexible, preferably opaque sheet material. The most preferred such material is paper, preferably of rather heavy guage for purpose of strength. For ease of reference, the material of the envelope is referred to throughout as paper, although it is understood that other materials of obviously suitable properties may be substituted. The sheet of paper is cut or otherwise formed to the general outline shown in FIGURE 1. This sheet comprises a front 12, a flap 14 at the top of the front 12, and an envelope tab 15 at the top of flap 14. Folds and fold lines are indicated throughout the illustrations by means of capital letters, as are perforation lines. Thus, there is a fold line C between flap 14 and front 12, and a perforation line D between envelope tab 15 and flap 14.

The perforation line D, which is indicated by a dashed line, and the other perforation lines illustrated throughout, which are also indicated by lettered-lines, are of the type generally produced by die cutting or otherwise forming a series of small cuts or slits along a line on a sheet of paper so that the line is weakened to facilitate easy and accurate tearing along the line.

A finisher's sleeve, generally designated at 10 is attached to the front 12, separated by perforation line B. The finisher's sleeve 10 comprises a finisher's sleeve body 16 and a finisher's sleeve tab 17. Fold line E lies between tab 17 and body 16. A bottom tab 18 is provided at the bottom of front 12, at the side opposite flap 14, and is separated from front 12 by perforation line A. Bottom tab 18 is coated with a surface of glue 32. The edge of finisher's sleeve body 16 most remote from front 12 is also provided with a strip of glue 32.

A back, generally designated at 20, is provided to the right of front 12. This back 20, which later becomes in use and is identified as the permanent negative file, is separated from front 12 by means of perforated line F. The perforated line F is curved at or near the middle thereof into the surface of front 12, so as to define a lock tab 26. The lock tab 26 is separated from the major portion of back 20 by means of fold line F'. A slit 23' is provided in a vertical direction through back 20 toward the right side thereof. As is made apparent below, this slit 23' is adapted to receive lock tab 26 in the final stage of the envelope's use. The right hand edge of the single thickness sheet material portion of back 20 is provided with glue 32. In FIGURE 1, this glue is shown as two relatively short separated strips at the top and bottom of the edge, and it is understood that this glued area can be extended the entire length of the edge of back 20, provided that it is moved inwardly from the extreme edge so that the glued area does not interfere with the remaining portion of the permanent negative file, which is indicated in fragmented form in FIGURE 1. This remaining portion is described in more detail below in connection with FIGURE 3.

Preferable printed material is shown in typical form on back 20. It comprises column 21, headed "No," column 22 headed "Subject," and column 23 headed "Date." The columns are separated by fold lines G and H. Taken together, these columns comprise an index for the negatives permanently filed in connection therewith.

The fragmented portion at the extreme right of FIGURE 1 is better shown in FIGURE 3. The remaining part, as shown in FIGURE 3, generally designated 40, is the permanent negative pocket. This permanent negative pocket 40, taken together with the back 20 and its index, constitute the permanent negative file. Pocket 40 comprises an elongated receptacle or pocket having a rear face 41 and a front face 42. These faces are preferably made of flexible transparent or translucent sheet material, such as cellophane, one of the synthetic plastics as are well known to have the above-mentioned properties, or thin partially transparent paper. The thin, partially transparent paper has been found to be very satisfactory.

The pocket is preferably formed by folding a single sheet 41, 42 at the bottom to form the front and rear faces. Preferably, as is shown in FIGURE 3, the upper edge of front face 42 terminates before the upper edge of rear face 41. This makes it easier to insert film into the pocket. It is also possible of course, to make the pocket from separate rear faces and front faces, which are then glued together at the bottom with glue 32, as shown in FIGURE 1. It is understood that while the transparent, partially transparent or translucent pocket is preferred, it is possible to make the pocket of opaque material, which would not be as satisfactory, but would still be within the spirit of the invention. For purposes of reference herein, the pocket is referred to as transparent.

The permanent negative pocket 40 is attached to back 20 at the right edge thereof by any convenient means, such as gluing. A series of vertical fold lines, J, K, L, and M are provided in the pocket. Each pair of these folds defines a negative receiving section into which a strip of negatives, preferably a plurality thereof, may be inserted for permanent indexing and filing. In the embodiment shown in FIGURE 3, the pocket 40 is adapted to receive negatives in uncut strips of four each. The pocket shown in FIGURE 3 is provided with numbers on the front face 42 thereof. Each of these numbers, shown circled, gives the location of an individual negative. While the provision of these numbers is preferable, it is understood that many negatives are supplied with numbers on the edge thereof, so that the numbers on pocket 40 may not be necessary in all cases. It is also apparent that the scheme and type of numbering may vary widely within the scope of this invention. Preferably, the numbers on pocket 40 are keyed to corresponding numbers in column 21 on back 20.

The individual negative receiving sections may, if desired, be further delineated by gluing or otherwise fastening the front and rear faces together along the fold lines, such as K and L. As shown in FIGURE 3, the pocket comprises three sections, each holding four negatives, and the provision of additional negative receiving sections as indicated by the fragmentation at the right. It is understood that there is nothing critical to this invention in the number of negatives adapted to be received or the number of individual sections. There is nothing critical as to whether or not the number of negatives in each section is four. The preferable dimensions and arrangements for various uses are described further below.

In assembling the envelope for use, as shown in FIGURE 2, the pocket 40 is folded in "accordion" style along its fold lines, and rests over back 20. The finisher's sleeve 10 is folded along perforation B so that it overlies front 12. Back 20 is folded along line F, F' so that it overlies front 12 and sleeve 10, and the bottom tab 18 is then folded upward along line A. Surfaces are caused to adhere at each area where glue 32 is indicated. The assembled envelope 100, ready for its first function is shown in FIGURE 2. The reverse side of back 20 is shown uppermost. Of course, the order or method in which this initial assembly is made is not critical as long as the illustrated envelope 100 is produced as shown in FIGURE 2.

FIGURE 6 shows the reverse side of front 12 which was illustrated in FIGURE 1. The side of front 12 shown in FIGURE 6 is of course, the outermost surface of the envelope 100 after it had been assembled into the form shown in FIGURE 2. Typical organization of printed information on this surface is shown in FIGURE 6. The use of this preferred organization in connection with the structure of the envelope is explained in further detail below.

FIGURE 5 is a partial view of an alternate form of back 20A. The printed material shown in FIGURE 5 is another arrangement of indexing, which could be substituted for the arrangement or organization shown in FIGURE 1. The meaning of the various columns and areas on alternate back 20A are self-explanatory from FIGURE 5.

Before explaining FIGURES 4a and 4b in detail, the function of the envelope as described above is explained further. The assembled envelope 100, as shown in FIGURES 2 and 6 is a suitable container for receiving unfinished photographic film which is to be developed or otherwise processed. The retailer or user places the undeveloped film into the envelope 100. The appropriate identifying or other information, as indicated by the typical printing shown in FIGURE 6, is written on envelope 100. The envelope tab 15 may be torn off along perforation D, and serves as a receipt. Flap 14 is then folded over along fold C to close the envelope. The edge of flap 14 may be provided with glue or other affixing means if desired to seal the envelope. The envelope is then usable to store the film and ship it to the finisher.

Another possible form for the organization shown in FIGURE 6 is that of a mail order return envelope. The envelope surface shown in FIGURE 6 may be addressed and pre-stamped to the user of the film, with the finisher's return address in a corner, as is normal. It is possible to conduct the entire process of film purchase, return to finisher for processing, and return of finisher film to the user, all by mail, using this envelope.

The second function of the envelope is performed when the negatives have been developed. This discussion relates primarily to types of film in which the negatives are not ordinarily returned to the user cut into individual picture. It has been customary to wind long strips of negative film around cardboard bobbins, or to insert them into cylindrical capped containers, for return to the photographer. Prints, either color or black and white, are generally placed into a separate folder or envelope, and the negative holding means and the print holding means are then inserted into another envelope for transport. In present day high volume public film processing, the elimination of steps in the handling and return of film is important. With the envelope 100 of this invention, the negatives need not be separately wound onto or into any holding means. The finisher cuts a long strip of individual negative pictures into shorter strips and inserts them behind finisher's sleeve tab 17 into finisher's sleeve 10. The prints, if any, are then inserted without further holding means into envelope 100, in front of tab 17. A preferred form of tab 17 is flared, as shown in FIGURES 1 and 2. This structure makes it easier for the finisher to slip the negatives into the sleeve, by acting as a guide.

The finished negatives and prints are returned to the user in the above-described organization.

The next function of the present invention is best described in connection with FIGURES 4a and 4b. After receipt of the finished materials, the user may open envelope 100 by tearing along perforations B, A, and F (as shown in FIGURE 1). The permanent file 20, 40, as shown in FIGURES 4a and 4b is retained by the user. The negatives are removed from sleeve 10, and are inserted into permanent negative pocket 40, as has been described. It may be necessary to cut the strips supplied in sleeve 10 to properly fit into pocket 40, although ordinarily this would not be necessary. The user then identifies each filed negative by appropriate notation in columns 21, 22, 23, or on a form such as shown in FIGURE 5. By folding in an obvious manner on the lines separating the columns 21, 22, and 23, and inserting lock tab 26 into slit 23′, the complete indexed permanent negative file 20 is obtained, as shown in FIGURE 4b.

In FIGURE 7 is illustrated another embodiment of the envelope of this invention, generally designated 200, before assembly. The general disclosure made above in connection with FIGURES 1, 2, and 3 apply to the emmodiment of FIGURES 7 and 8 also. Referring to FIGURE 7, the envelope generally consists of a front 50 having a flap 51 at the top thereof, separated by a fold line U. An envelope tab 52 is provided above flap 51, and separated therefrom by perforated line V. A side tab 58 is provided at the left hand side of the front 50, and is separated therefrom by a perforated line S. A strip of glue, 32, is provided on side tab 58. A bottom tab 59 is provided at the bottom of front 50 and is separated therefrom by perforated line T. A strip of glue is provided on tab 59 as shown.

A back 53 is provided on the right side of front 50 and is separated therefrom by perforated line L. A permanent negative pocket 60 is affixed to back 53 by gluing or otherwise attaching along the surface 60A. In FIGURE 7, the pocket 60 is shown in its folded "accordion" position, in the same way that pocket 40 is shown in FIGURE 4a. The pocket 60 of the embodiment of FIGURE 7 is in all respects the same as the pocket described in detail in connection with FIGURE 3.

The permanent negative pocket 60 is shown partially fragmented in FIGURE 7 to reveal the slit 53′ through back 53. That portion of back 53 to the right of the pocket 60 is typically printed as shown, forming columns 54, 55, and 56, which are headed respectively "Subject," "Date," and "No." This printed typical material together comprises the index for the permanent negative file. The various columns are delineated by fold lines M, N, T, and by perforated tear tine R, as well as the short fold line R′.

As can be seen from FIGURE 7, a lock tab 57″ extends from the right hand edge of column 56, and is separated therefrom by fold line R′.

A finisher's sleeve 57′ is provided to the right of the index, and is set off therefrom by the perforated tear line R. This sleeve extends up the right hand side of the envelope 200 and partially over the top side, as shown. It will be appreciated that to form the complete receptacle into which the finisher inserts negatives, additional parts of the envelope 200 are utilized, as well as the sleeve 57′. This is true also of the embodiment shown in FIGURE 1, but for ease of reference, only that part of the whole envelope which has its primary function as part of the sleeve is referred to as the finisher's sleeve.

The envelope shown in FIGURE 7 is partially shown in perspective by folding over the edges at the right hand side. This folding, which is done for purposes of illustration only, shows the glue strip 32 which is affixed to the right hand edge of envelope 200 on the reverse side of the sheet.

The finisher's sleeve 57′ is preferably provided with a slight flare at its top end, as shown in FIGURES 7 and 8, to help the finisher guide the negatives into the completed sleeve.

The envelope shown in FIGURE 7 is then folded and glued to make the initial product illustrated in FIGURE 8. A fold is made up on fold line N, so that the finisher's sleeve 57′ overlies at least partially, the negative receiving section 60. The fold up is made along perforated line L, so that the entire permanent negative file and the finisher's sleeve overlie front 50. The glue strip 32 on the finisher's sleeve is fixed to front 50, and the side tab 58 and bottom tab 59 are then folded up and glued.

After this assembly operation, which can be performed in any suitable manner and order, the envelope 200 as shown in FIGURE 8, is produced. The use and function of the envelope illustrated in FIGURES 2 and 6, as described above, is applicable to the envelope of FIGURE 8. After use of the envelope 200 in the manner already described, it may now be altered to the product which serves as a permanent negative file and index. Referring again to FIGURE 7, the user tears along perforated lines L and R, thus separating those parts of the envelope 200 which constitute the permanent negative file, from the remaining parts, which may now be disposed of. Of course, these tears are made on the envelope as it appears in FIGURE 8. The comments made in connection with the permanent negative file illustrated in FIGURES 4a and 4b are equally applicable to the permanent negative file 53 and its attached receiving section 60. The variations in printing and organization of information as described in connection with FIGURES 5 and 6 for example, are of course equally applicable to the envelope embodiment illustrated in FIGURES 7 and 8.

In each instance in the foregoing description where a perforated line is set forth, it is also possible to substitute for the perforated line a pull-string 92, as illustrated generally in FIGURE 9. Pull-string 92 is shown partially separating back sheet 90 and front sheet 91. Such pull-strings are in themselves known, and no claim to a string type of opener per se is made herein. While the pull-string may be used in place of the perforated lines at all marked places, the value of such a string is not as great when used as a substitute for perforated lines V or D, which separate envelope tabs 52 and 15 respectively from the main body of the envelopes. The use of a pull-string gives greater strength to the envelope.

No limitation in the present invention should be understood as to specific film types or sizes. The invention, for example, can be applied to film sizes 127, 620, or to 35 mm. films. Generally, in use with 35 mm. film, the negative will be cut into strips of four each; in 127 film, in strips of three each; in 620 film, in strips of two each, but the utility of the invention is not limited to these strip lengths.

Throughout the specification, reference has been made to various fold lines. It is obvious from the context that folds may exist along these lines at some stages in the use of the invention and not in others. It is also obvious that the fold lines may or may not be physically printed on the sheet material. While a great utility of this invention lies in the furnishing of negatives and prints to the photographer or user at the same time, it is apparent that the device has utility when only negatives or prints are returned therein.

The scope of this invention is to be determined by the appended claims and is not to be limited to the above described and illustrated embodiments, which are intended to be illustrative only, and not limiting.

I claim:

1. An envelope adapted for the transport of unfinished photographic films, transport of finished photographic negatives and prints, and permanent filing of finished photographic negatives, successively, comprising sheet material folded and secured to form a front and back of the envelope and a finisher's sleeve connected to the front in side to side relationship and folded within the envelope with its inner edge secured to the front, a closing flap at one end of said front, a bottom tab at the other end of said front overlying and secured to the back, said back having a negative index printed theereon and having a foldable permanent negative pocket affixed thereto, said back being separable from the reminder of said envelope by tearable lines and comprising a permanent negative file when separated and said envelope, said sleeve and said pocket all being open at the same side of the envelope.

2. An envelope as set forth in claim 1 wherein a lock tab extends from one side edge of said back and a slit adapted to receive said lock tab is provided in said back.

3. An envelope as set forth in claim 2 wherein said foldable permanent negative pocket comprises a plurality of negative receiving sections and said pocket is made of flexible sheet material capable of transmitting light.

4. An envelope as set forth in claim 3 wherein a finisher's sleeve tab is provided on said finisher's sleeve and a separable envelope tab is provided on said envelope flap, said finisher's sleeve tab serving as a guide to aid the insertion of negatives into said finisher's sleeve, and said envelope tab serving as a receipt.

References Cited in the file of this patent
UNITED STATES PATENTS

| | | |
|---|---|---|
| 1,087,868 | Bochert | Feb. 17, 1914 |
| 1,163,459 | Rheutan | Dec. 7, 1915 |
| 1,220,796 | Sutter | Mar. 27, 1917 |
| 1,666,957 | Cather | Apr. 24, 1928 |
| 2,175,508 | Mandelbaum | Oct. 10, 1939 |
| 2,855,138 | Hopkin | Oct. 7, 1958 |
| 2,936,945 | Whitman | May 17, 1960 |
| 2,956,726 | Pieronek et al. | Oct. 18, 1960 |